(12) United States Patent
Jurbergs (10) Patent No.: US 6,529,655 B1
(45) Date of Patent: Mar. 4, 2003

(54) FRUSTRATED TOTAL INTERNAL REFLECTION OPTICAL SWITCH USING WAVEGUIDES AND METHOD OF OPERATION

(75) Inventor: David C. Jurbergs, Fort Worth, TX (US)

(73) Assignee: Optical Switch Corporation, Richardson, TX (US)

( * ) Notice: Subject to any disclaimer, the term of this patent is extended or adjusted under 35 U.S.C. 154(b) by 0 days.

(21) Appl. No.: 09/712,591

(22) Filed: Nov. 14, 2000

(51) Int. Cl.⁷ .................................................. G02B 6/26
(52) U.S. Cl. ....................................................... 385/19
(58) Field of Search .............................. 385/16, 17, 18, 385/19, 25

(56) References Cited

U.S. PATENT DOCUMENTS

| | | | |
|---|---|---|---|
| 3,514,183 A | * 5/1970 | Rabedeau | 359/222 |
| 3,520,595 A | * 7/1970 | Treuthart | 359/222 |
| 3,666,358 A | 5/1972 | Banks | 353/25 |
| 4,121,884 A | 10/1978 | Greenwood | 350/96.15 |
| 4,474,434 A | * 10/1984 | Carlsen et al. | 359/320 |
| 5,221,987 A | 6/1993 | Laughlin | 359/222 |
| 5,369,718 A | 11/1994 | Kamata et al. | 385/21 |
| 5,444,801 A | 8/1995 | Laughlin | 385/16 |
| 5,553,175 A | 9/1996 | Laughlin | 385/16 |
| 5,555,327 A | 9/1996 | Laughlin | 385/16 |
| 5,555,558 A | 9/1996 | Laughlin | 385/16 |
| 5,566,260 A | 10/1996 | Laughlin | 385/16 |
| 5,647,033 A | 7/1997 | Laughlin | 385/16 |
| 5,732,168 A | 3/1998 | Donald | 385/16 |
| 5,796,880 A | * 8/1998 | Ford et al. | 385/1 |
| 5,828,799 A | 10/1998 | Donald | 385/16 |
| 5,841,916 A | 11/1998 | Laughlin | 385/16 |
| 5,875,271 A | * 2/1999 | Laughlin | 385/16 |
| 5,909,301 A | 6/1999 | Laughlin | 359/222 |
| 5,917,641 A | 6/1999 | Laughlin | 359/222 |
| 5,959,756 A | * 9/1999 | Keyworth et al. | 359/196 |
| 6,236,778 B1 | * 5/2001 | Laughlin | 385/22 |
| 6,289,152 B1 | * 9/2001 | Zhang et al. | 385/33 |
| 6,320,996 B1 | * 11/2001 | Scobey et al. | 385/18 |

* cited by examiner

*Primary Examiner*—Brian Sircus
*Assistant Examiner*—Thanh-Tam Le
(74) *Attorney, Agent, or Firm*—Baker Botts L.L.P.

(57) ABSTRACT

An optical switch for processing an optical signal includes a refractive material and an input waveguide formed in the refractive material that is operable to receive an optical signal. First and second output waveguides are also formed in the refractive material. A switchplate is coupled to the refractive material and has a first position spaced apart from the input waveguide and a second position in proximal contact with the input waveguide. When the switchplate is placed in the first position, the input waveguide totally internally reflects the optical signal toward the first output waveguide. When the switchplate is placed in the second position, the switchplate frustrates the total internal reflection of the optical signal such that the second output waveguide receives the optical signal.

25 Claims, 7 Drawing Sheets

FRUSTRATED TOTAL INTERNAL REFLECTION OPTICAL SWITCH USING WAVEGUIDES AND METHOD OF OPERATION

TECHNICAL FIELD OF THE INVENTION

This invention relates to the field of frustrated total internal reflection devices and more particularly to a frustrated total internal reflection optical switch using waveguides.

BACKGROUND OF THE INVENTION

Fiber-optic communication systems include optical components, such as optical fibers coupled to switching components, that receive, transmit, and otherwise process information in optical signals. The switching components in a fiber-optic communication system selectively direct the information carried by the optical signal to one or more other optical components. A problem with existing fiber-optic communication systems is that they require many complex optical components to perform the switching function. This adds to the cost and size of the fiber-optic communication system. It also leads to slower switching speeds and difficulties with aligning the switching components.

SUMMARY OF THE INVENTION

A frustrated total internal reflection switch using waveguides is provided that substantially eliminates or reduces disadvantages and problems associated with previous optical switches.

In accordance with one embodiment of the present invention, an optical switch for processing an optical signal includes a refractive material and an input waveguide formed in the refractive material and operable to receive an optical signal. The optical switch further includes a first output waveguide formed in the refractive material, a second output waveguide formed in the refractive material, and a switchplate coupled to the refractive material. The switchplate has a first position spaced apart from the input waveguide such that the input waveguide totally internally reflects the optical signal toward the first output waveguide. The switchplate has a second position in proximal contact with the input waveguide to frustrate the total internal reflection of the optical signal such that the second output waveguide receives the optical signal.

Another embodiment of the present invention is a method for processing an optical signal that includes receiving an optical signal at an input waveguide formed in a first refractive material. The method continues by placing a switchplate in a first position spaced apart from the input waveguide such that the input waveguide totally internally reflects the optical signal toward a first output waveguide formed in the first refractive material. The method continues by placing the switchplate in a second position in proximal contact with the input waveguide to frustrate the total internal reflection of the optical signal. The method concludes by totally internally reflecting the optical signal at a reflective surface of the switchplate toward a second output waveguide formed in the first refractive material.

A technical advantage of the present invention includes one embodiment of a frustrated total internal reflection optical switch that includes waveguides formed in a refractive material to direct an optical signal to and from the switching region. This particular embodiment of the optical switch eliminates the use of collimating and decollimating lenses so that the optical switch can be constructed using fewer components which may increase the packing density of the switch. The reduced number of components in the optical switch reduces the number of interfaces in the path of the optical signal which, in turn, increases the stability and robustness of the optical switch.

Further technical advantages are gained with respect to the alignment and positioning of a switchplate assembly of the optical switch. Because waveguides direct the optical signal to and from the switching region, a visible light source can be directed into an input and/or output waveguide toward the switching region and can thereby assist in the alignment of the switchplate contact region. In addition, as the waveguides are predefined in the refractive material, the insertion loss of each waveguide channel can be monitored to locate the correct position of the switchplate assembly. Furthermore, as the optical signal is not collimated prior to communication to the switching region, the aperture size of the optical signal is reduced. The reduced aperture size of the optical signal reduces the difficulty of fabricating and aligning a switchplate assembly at the switching region.

In one embodiment, integrated v-grooves are formed in the refractive material and used to couple optical fibers to appropriate waveguides. A particular advantage of the integrated v-grooves is that they facilitate automatic passive alignment of the optical fibers with the waveguides which increases the throughput of the optical signal. Furthermore, the integrated v-grooves are amenable to batch processing, thereby reducing production time and costs. Because the use of waveguides to direct the optical signal to and from the switching region obviates the need for collimating and decollimating lenses to preprocess the optical signal, the alignment of the optical fibers, or any other optical devices, is simplified.

Other technical advantages are readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying figures in which like reference numbers indicate like features and wherein.

DETAILED DESCRIPTION OF THE INVENTION

Figure 1A:
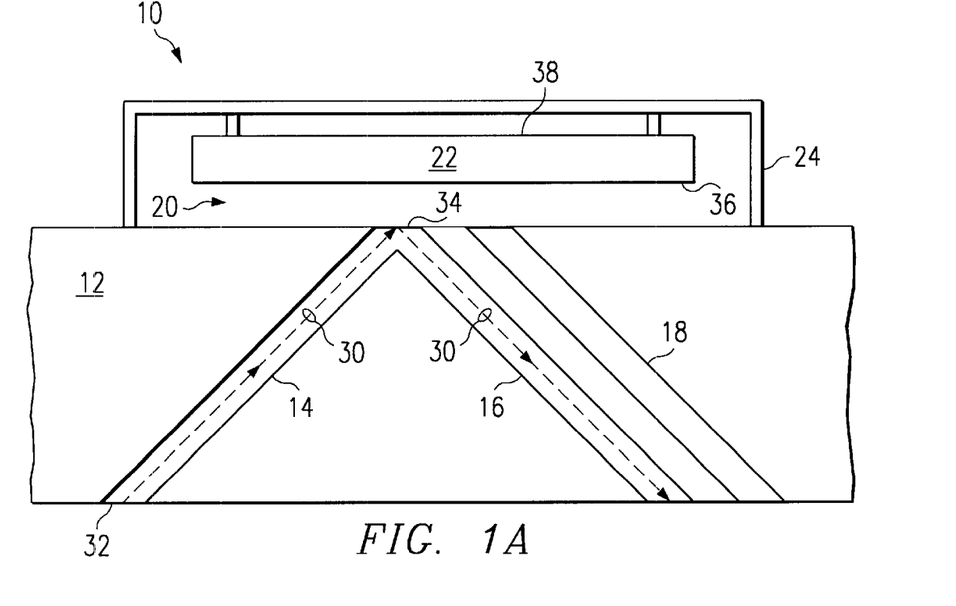
FIGS. 1A–1B illustrate a 1×2 embodiment of an optical switch in accordance with the present invention.
Figure 1B:
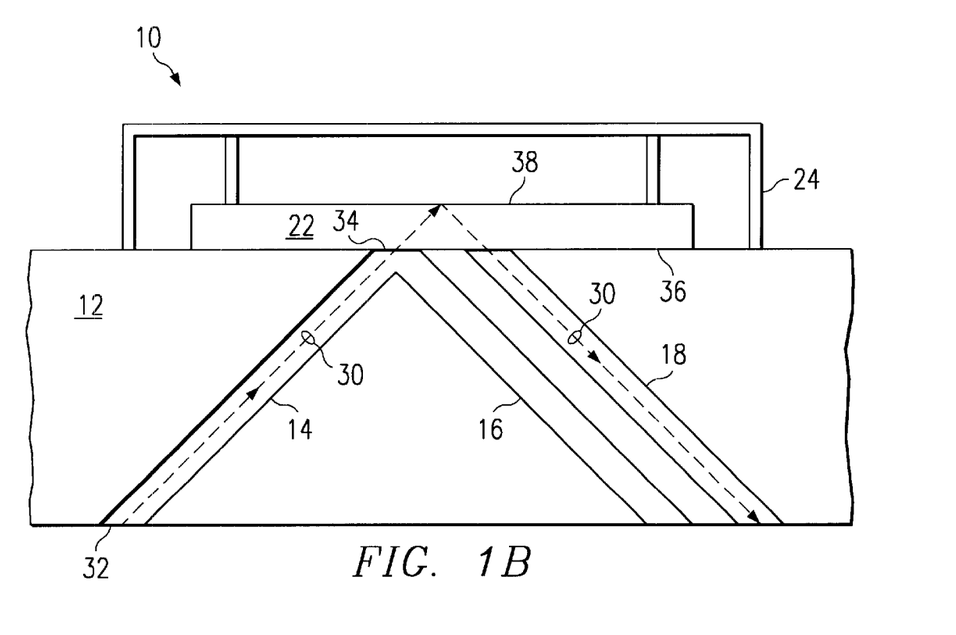

FIGS. 1A–1B illustrate one embodiment of a frustrated total internal reflection (FTIR) optical switch 10 that includes a first refractive material 12, an input waveguide 14, a first output waveguide 16, a second output waveguide 18, a second refractive material 20, and a switchplate 22 coupled to first refractive material 12 using an actuator 24. In general, optical switch 10 receives an optical signal 30 and selectively communicates signal 30 to output waveguide 16 and/or output waveguide 18 based upon the position of switchplate 22. In this respect, FIGS. 1A–1B illustrate a 1×2 optical switch 10.

First refractive material 12 comprises a silicon chip, fused silica, a polymer film, or any other suitable configuration of optically transmissive material, such as glass. Material 12 may be selected to provide a particular index of refraction, $n_1$, at a particular wavelength of optical signal 30.

Waveguides 14, 16 and 18 each comprise an optical waveguide formed by any arrangement of suitable optically transmissive material. The materials used to form waveguides 14, 16, and 18 in refractive material 12 may be selected to provide particular indices of refraction, $n_2$, $n_3$, $n_4$, respectively, that are higher than that of material 12 such that waveguides 14, 16, and 18 communicate signal 30 as a guided wave of energy. In this respect, each of waveguides 14, 16, and 18 is operable to guide the flow of radiant energy along a path parallel to its axis and to contain the energy of signal 30 within or adjacent to its surface. In one embodiment of switch 10, waveguides 14, 16, and 18 each comprise optical fibers (referred to generally as input optical fiber 14, and output optical fibers 16 and 18) that include a core designed to transmit or receive information in the form of light pulses, and a cladding that surrounds the core to prevent signal 30 from escaping the core during transmission. In another embodiment of switch 10, waveguides 14–18 each comprise a planar waveguide formed in refractive material 12. Optical signal 30 comprises visible light, infrared radiation, ultra-violet radiation, or any other suitable optical beam.

Second refractive material 20 comprises air or any other suitable substance that has an index of refraction, $n_5$, lower than that of waveguides 14, 16, and 18. Accordingly, if optical signal 30 propagates from a first surface 32 to a second surface 34 of waveguide 14 at an angle equal to or above a critical angle of refraction associated with the interface between waveguide 14 and material 20, then second surface 34 of waveguide 14 totally internally reflects optical signal 30. Second surface 34 of waveguide 14 therefore reflects optical signal 30 by total internal reflection (TIR).

Switchplate 22 is coupled to material 12 using actuator 24 and comprises any suitable refractive material having a contact surface 36 and a reflective surface 38. The index of refraction of switchplate 22 is substantially similar to the index of refraction of waveguides 14, 16, and/or 18. Switchplate 22 may be formed in many configurations without deviating from the inventive concepts of the present invention. In one embodiment of switchplate 22, reflective surface 38 is substantially parallel to contact surface 36. In another embodiment described in greater detail with reference to FIG. 5A, reflective surface 38 comprises a convex surface. In yet another embodiment, switchplate 22 comprises a gradient index (GRIN) lens. The reflectivity of surface 38 may be caused by total internal reflection or by a reflective material coating surface 38.

Switchplate 22 has a first position spaced apart from the optical waveguides and a second position in proximal contact with the optical waveguides to frustrate the total internal reflection of signal 30. Optical switch 10 communicates optical signal 30 to first output waveguide 16 when switchplate 22 is spaced apart from input waveguide 14, as described with reference to FIG. 1A. When switchplate 22 is placed in proximal contact with input waveguide 14, optical switch 10 communicates optical signal 30 to second output waveguide 18 as described in greater detail with reference to FIG. 1B. The term "proximal contact" refers not only to direct contact between switchplate 22 and input waveguide 14, but also contemplates any spacing or partial contact between switchplate 22 and input waveguide 14 to frustrate the total internal reflection of optical signal 30 to a desired degree.

Actuator 24 comprises a piezoelectric device, a bimorph transducer, or any other suitable material that displaces switchplate 22 in response to an electrical, thermal, or otherwise appropriate control signal. Activating and deactivating actuator 24 coupled to switchplate 22 causes actuator 24 to bring switchplate 22 into and out of proximal contact with material 12. U.S. Pat. Nos. 5,555,327 and 5,909,301 disclose a variety of techniques and components to construct switchplate 22, actuator 24, and combinations thereof that may be used with optical switch 10, and are herein incorporated by reference.

In operation of optical switch 10 with switchplate 22 spaced apart from second surface 34 of input waveguide 14, as illustrated in FIG. 1A, optical switch 10 receives optical signal 30 such that signal 30 propagates from first surface 32 to second surface 34 within input waveguide 14. Total internal reflection at the interface between material 20 and second surface 34 of input waveguide 14 directs optical signal 30 to output waveguide 16. Therefore, FIG. 1A illustrates the operation of switch 10 with switchplate 22 spaced apart from input waveguide 14.

In operation of switch 10 with switchplate 22 placed in proximal contact with waveguide 14, as illustrated in FIG. 1B, optical switch 10 receives optical signal 30 such that signal 30 propagates from first surface 32 to second surface 34 within input waveguide 14. Actuator 24 places switchplate 22 in proximal contact with surface 34 of waveguide 14. Switchplate 22 frustrates the total internal reflection of optical signal 30 at surface 34. Reflective surface 38 of switchplate 22 directs optical signal 30 to second output waveguide 18. Therefore, FIG. 1B illustrates the operation of switch 10 with switchplate 22 placed in proximal contact with waveguide 14.

Optical switch 10 provides many technical advantages with respect to the alignment and positioning of switchplate 22. Because waveguides 14, 16, and 18 direct optical signal 30 to and from the switching region, a visible light source can be directed into an input and/or output waveguide toward the switching region and can thereby assist in the alignment of the switchplate 22 contact region. In addition, as the waveguides are predefined in refractive material 12, the insertion loss of each waveguide channel can be monitored to locate the correct position of switchplate 22. Furthermore, as optical signal 30 is not collimated prior to communication to the switching region, the aperture size of optical signal 30 is reduced. The reduced aperture size of optical signal 30 reduces the difficulty of fabricating and aligning switchplate 22 at the switching region.

FIGS. 2A–2D illustrate a 1×4 embodiment of optical switch 10 that includes a second switchplate 22, a second actuator 24, and output waveguides 50–56. In general, optical switch 10 receives optical signal 30 and selectively communicates signal 30 to output waveguide 50, 52, 54, and/or 56 based upon the position of first and second switchplates 22.

Waveguides 50–56 each comprise an optical waveguide formed by any arrangement of suitable optically transmissive material. The materials used to form waveguides 50–56 in refractive material 12 may be selected to provide particular indices of refraction that are higher than that of material 12 such that waveguides 50–56 communicate signal 30 as a guided wave of energy. Like waveguides 14–18, each of waveguides 50–56 is operable to guide the flow of radiant energy along a path parallel to its axis and to contain the energy of signal 30 within or adjacent to its surface. In one embodiment of switch 10, waveguides 50–56 each comprise optical fibers, as described above with reference to waveguides 14–18. In another embodiment of switch 10, waveguides 50–56 each comprise a planar waveguide formed in refractive material 12, as described above with reference to waveguides 14–18.

Figure 2A:
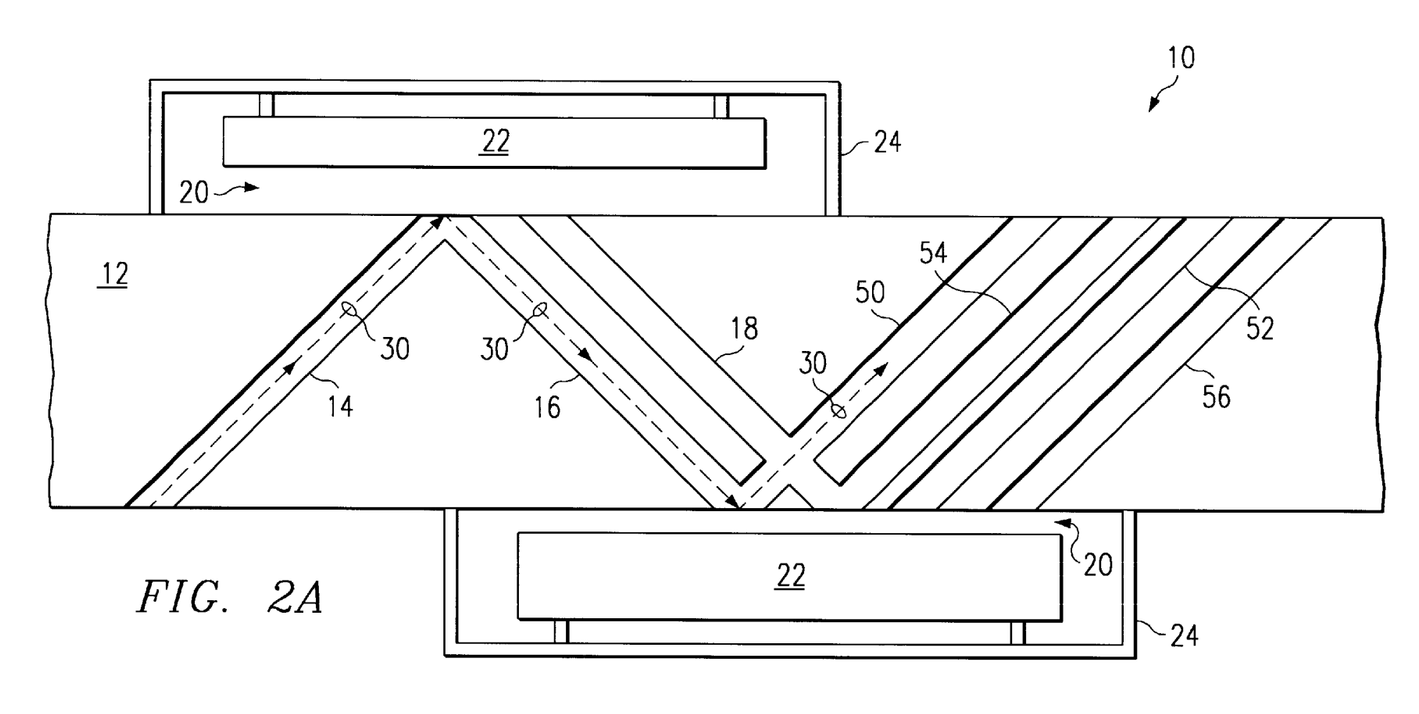
FIGS. 2A–2D illustrate a 1×4 embodiment of the optical switch in accordance with the present invention.

In operation of optical switch 10 with first switchplate 22 spaced apart from input waveguide 14 and second switchplate 22 spaced apart from output waveguide 16, as illustrated in FIG. 2A, optical switch 10 receives optical signal 30 such that signal 30 propagates through input waveguide 14. Total internal reflection at the interface between material 20 and input waveguide 14 directs optical signal 30 to output waveguide 16. Total internal reflection at the interface between material 20 and output waveguide 16 directs optical signal 30 to output waveguide 50. Therefore, FIG. 2A illustrates the operation of switch 10 with first switchplate 22 spaced apart from input waveguide 14 and second switchplate 22 spaced apart from output waveguide 16.

Figure 2B:
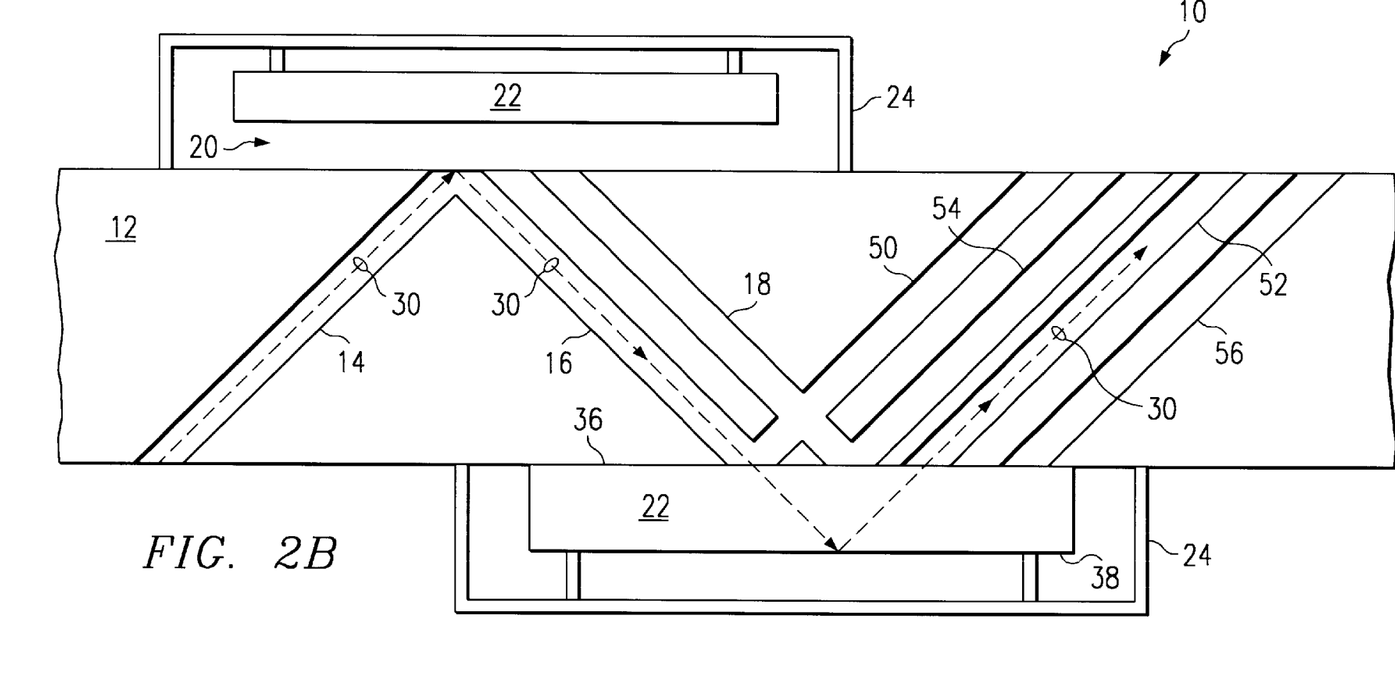

In operation of optical switch 10 with first switchplate 22 spaced apart from input waveguide 14 and second switchplate 22 in proximal contact with output waveguide 16, as illustrated in FIG. 2B, optical switch 10 receives optical signal 30 such that signal 30 propagates through input waveguide 14. Total internal reflection at the interface between material 20 and input waveguide 14 directs optical signal 30 to output waveguide 16. Second actuator 24 places second switchplate 22 in proximal contact with output waveguide 16 such that second switchplate 22 frustrates the total internal reflection of optical signal 30. Reflective surface 38 of second switchplate 22 directs optical signal 30 to output waveguide 52. Therefore, FIG. 2B illustrates the operation of switch 10 with first switchplate 22 spaced apart from input waveguide 14 and second switchplate 22 placed in proximal contact with output waveguide 16.

Figure 2C:
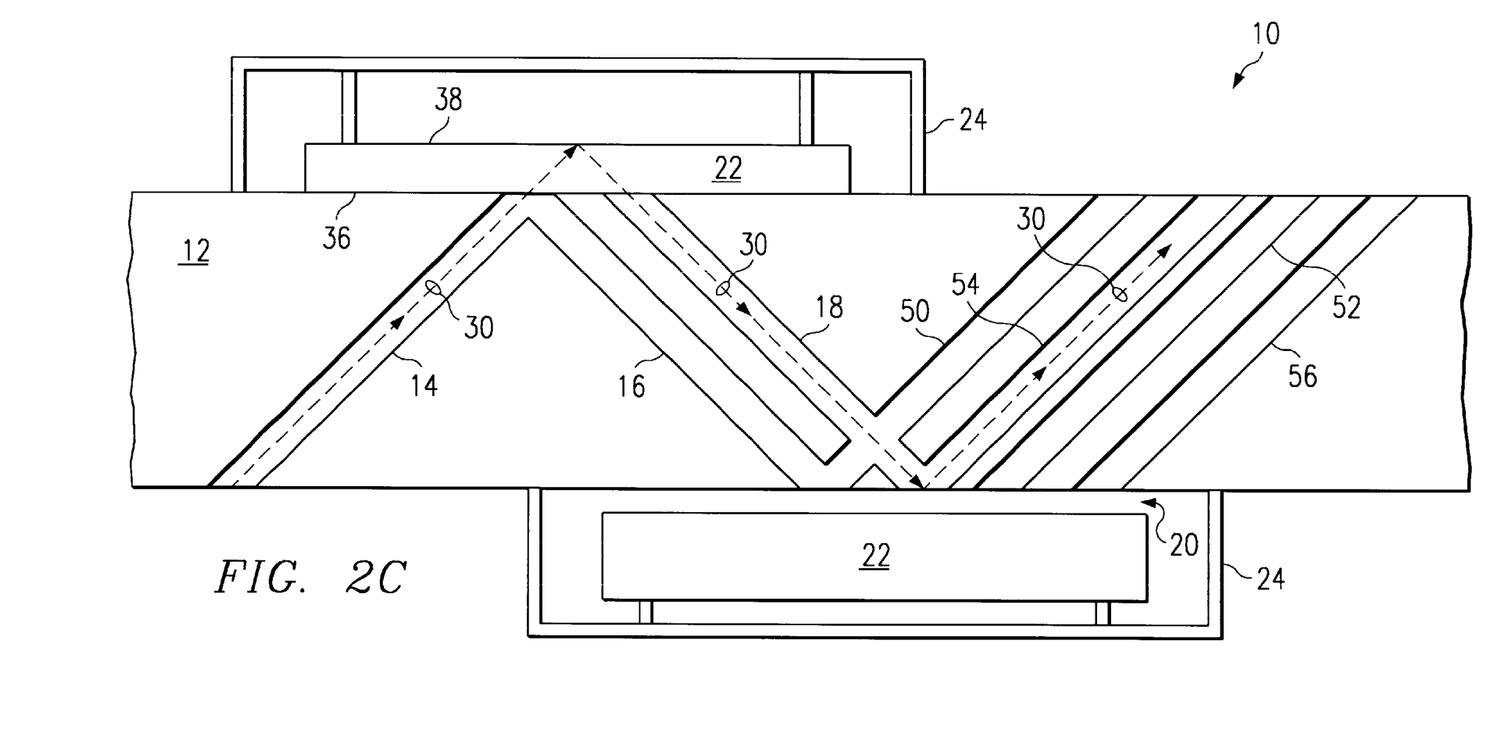

In operation of switch 10 with first switchplate 22 placed in proximal contact with input waveguide 14 and second switchplate 22 spaced apart from output waveguide 18, as illustrated in FIG. 2C, optical switch 10 receives optical signal 30 such that signal 30 propagates through input waveguide 14. First actuator 24 places first switchplate 22 in proximal contact with input waveguide 14. First switchplate 22 frustrates the total internal reflection of optical signal 30. Reflective surface 38 of first switchplate 22 directs optical signal 30 to output waveguide 18. Total internal reflection at the interface between material 20 and output waveguide 18 directs optical signal 30 to output waveguide 54. Therefore, FIG. 2C illustrates the operation of switch 10 with first switchplate 22 placed in proximal contact with input waveguide 14 and second switchplate 22 spaced apart from output waveguide 18.

Figure 2D:
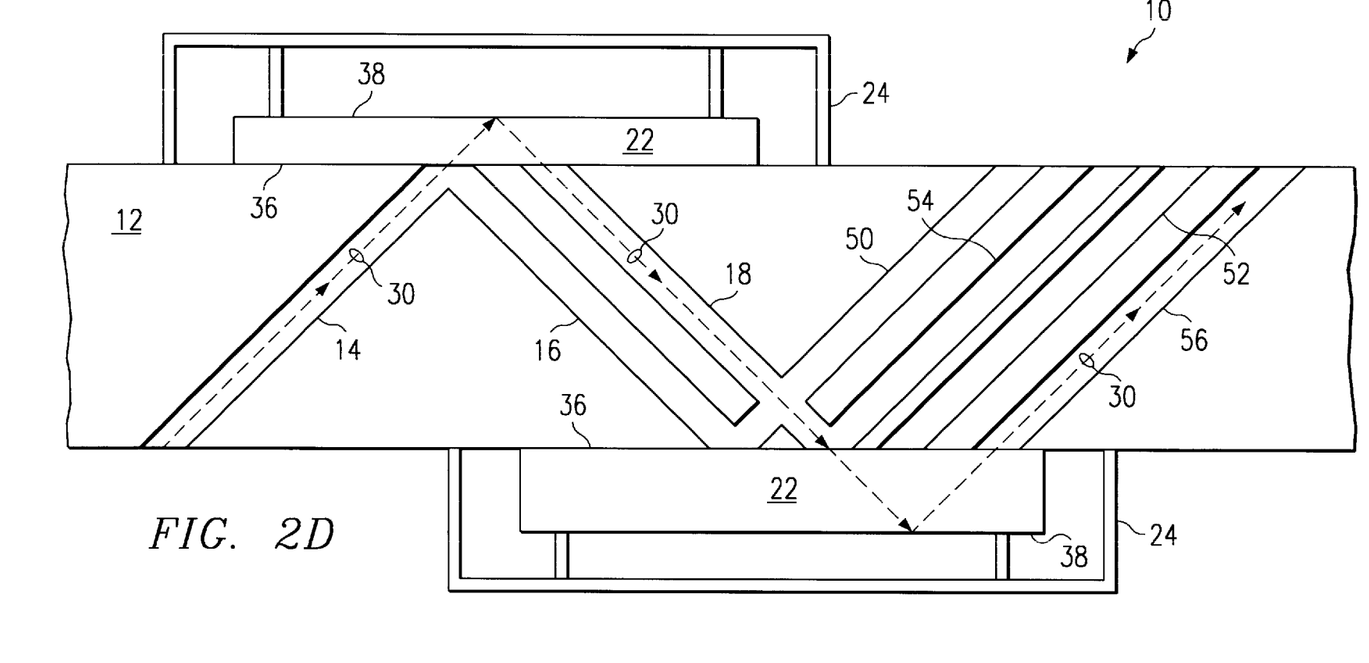

In operation of switch 10 with first switchplate 22 placed in proximal contact with input waveguide 14 and second switchplate 22 placed in proximal contact with output waveguide 18, as illustrated in FIG. 2D, optical switch 10 receives optical signal 30 such that signal 30 propagates through input waveguide 14. First actuator 24 places first switchplate 22 in proximal contact with input waveguide 14. First switchplate 22 frustrates the total internal reflection of optical signal 30. Reflective surface 38 of first switchplate 22 directs optical signal 30 to output waveguide 18. Second actuator 24 places second switchplate 22 in proximal contact with output waveguide 18 such that second switchplate 22 frustrates the total internal reflection of optical signal 30. Reflective surface 38 of second switchplate 22 directs optical signal 30 to output waveguide 56. Therefore, FIG. 2D illustrates the operation of switch 10 with first switchplate 22 placed in proximal contact with input waveguide 14 and second switchplate 22 placed in proximal contact with output waveguide 18.

Although FIGS. 1A–1B illustrate a 1×2 embodiment of switch 10 and FIGS. 2A–2B illustrate a 1×4 embodiment of of switch 10, it should be understood that switch 10 may be embodied in a n×m arrangement using any appropriate number and combination of input waveguides, output waveguides, switchplates 22, and actuators 24.

Figure 3:
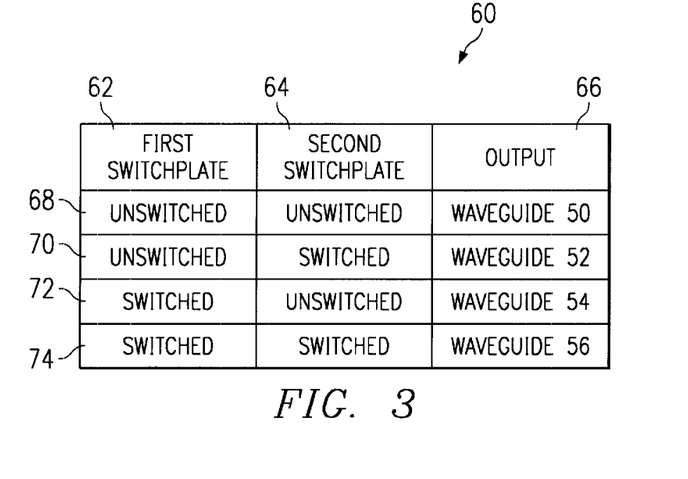
FIG. 3 illustrates one embodiment of a state table describing the operation of the optical switch.

FIG. 3 illustrates one embodiment of a state table 60 that includes switchplate position columns 62 and 64, output column 66, and entries 68–74. Switchplate position columns 62 and 64 indicate the position of first switchplate 22 and second switchplate 22 of switch 10, respectively. An indication that a switchplate 22 operates in an "unswitched" position means that the particular switchplate 22 operates in the first position spaced apart from the optical waveguides. An indication that a switchplate 22 operates in a "switched" position means that the particular switchplate 22 operates in the second position in proximal contact with the optical waveguides.

Referring to state table 60, entry 68 indicates that both first and second switchplates 22 operate in the unswitched position such that switch 10 communicates signal 30 to output waveguide 50, as illustrated in FIG. 2A. Entry 70 indicates that first switchplate operates in the unswitched position and second switchplate 22 operates in the switched position such that switch 10 communicates signal 30 to output waveguide 52, as illustrated in FIG. 2B. Entry 72 indicates that first switchplate operates in the switched position and second switchplate 22 operates in the unswitched position such that switch 10 communicates signal 30 to output waveguide 54, as illustrated in FIG. 2C. Entry 74 indicates that both first and second switchplates operate in the switched position such that switch 10 communicates signal 30 to output waveguide 56, as illustrated in FIG. 2D.

Figure 4:
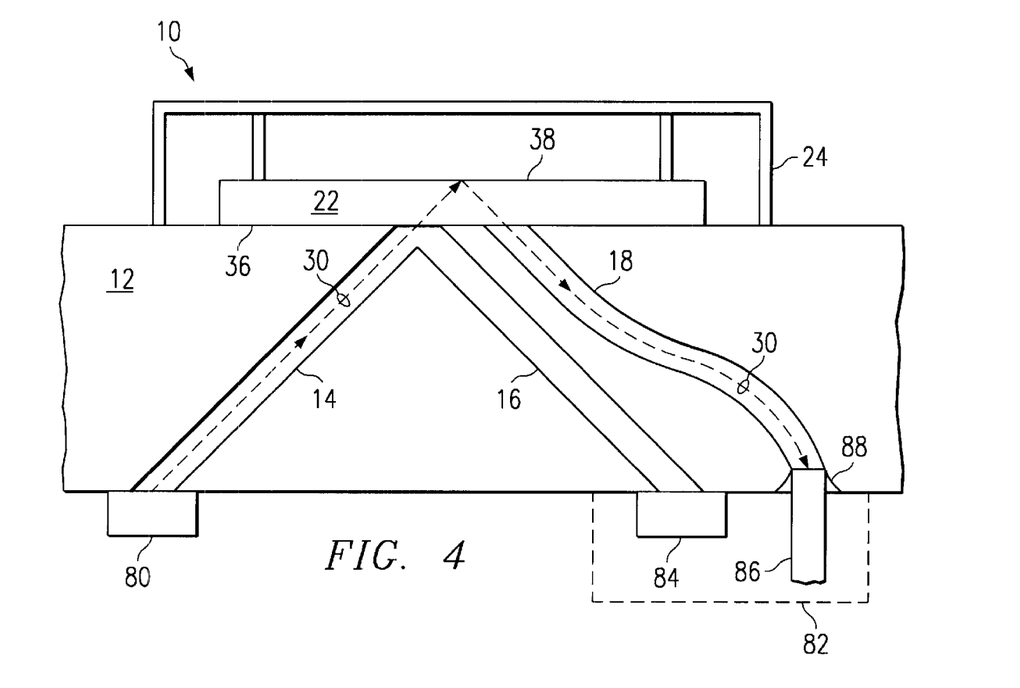
FIG. 4 illustrates one embodiment of the optical switch that includes input and output devices.

FIG. 4 illustrates one embodiment of switch 10 that includes an input device 80 coupled to input waveguide 14, and output devices 82 coupled to output waveguides 16 and/or 18. Input device 80 may comprise a laser, a light emitting diode, or any other source of optical signal 30 that may be coupled to a silicon chip, fused silica, a polymer film, or any other suitable configuration of optically transmissive materials that has an index of refraction similar to that of input waveguide 14, or that is positioned at a particular angle in relation to the interface between waveguide 14 and any other refractive material, to allow the introduction of optical signal 30 into waveguide 14 within the acceptance angle of waveguide 14.

An output device 82 may comprise an optical device, an electrical device, a mechanical device, a thermal device, or any combination of optical, electrical, mechanical, or thermal devices that perform further propagation, switching, multiplexing, or other suitable processing on optical signal 30. In a particular embodiment, an output device 82 may comprise an optical detector 84; one or more optical fibers 86 coupled to material 12 using, for example, an integrated v-groove 88; another optical switch 10; a prism coupled to a lens; or any other suitable optical component. A particular advantage of the present invention is that integrated v-grooves 88 may be formed in the substrate of material 12 itself, thereby allowing automatic passive alignment of optical fibers 86 which increases the throughput of optical signal 30. Furthermore, the integrated v-grooves 88 are amenable to batch processing, thereby reducing production time and costs.

In one embodiment of switch 10, one or more input and/or output waveguides may be curved, angled, or otherwise deviated such that it propagates optical signal 30 in any suitable direction from any suitable input position and/or to any suitable output position. A particular advantage of curving, angling, or otherwise deviating an input and/or output waveguide is that it provides appropriate spacing between neighboring input devices 80 and/or output devices 82 coupled to material 12. In this respect, the placement of input devices 80 and/or output devices 82 along a surface of material 12 is less restricted. It should be understood that any number and combination of input and/or output waveguides used in any suitable embodiment of switch 10 (e.g., 1×2, 1×4, or n×m switch embodiments), may be curved, angled, or otherwise deviated as illustrated in FIG. 4 without departing from the scope of the present invention.

Figure 5A:
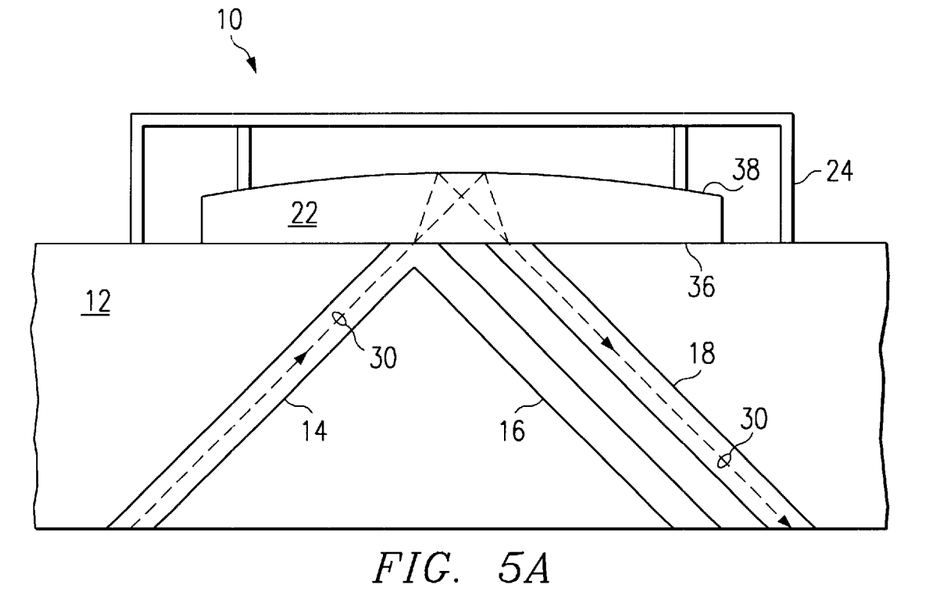
FIGS. 5A–5B illustrate different embodiments of a switchplate used in the optical switch.

FIG. 5A illustrates one embodiment of optical switch 10 that includes a switchplate 22 with a planar contact surface 36 and a convex reflective surface 38. Surface 36 of switchplate 22 is spaced apart from the input and output optical waveguides when switchplate 22 is placed in the first position, and makes proximal contact with the input and output optical waveguides when switchplate 22 is placed in the second position, as illustrated in FIG. 5A. Convex reflective surface 38 of switchplate 22 is formed having a particular radius of curvature.

In operation of switch 10 with switchplate 22 spaced apart from input waveguide 14, total internal reflection at the interface between material 20 and input waveguide 14 directs optical signal 30 to output waveguide 16. When switchplate 22 is placed in proximal contact with input waveguide 14, switchplate 22 frustrates the total internal reflection of signal 30. Depending upon the thickness and composition of switchplate 22, signal 30 may tend to diverge while propagating from surface 36 of switchplate 22 to surface 38 of switchplate 22. Convex reflective surface 38 of switchplate 22 reflects diverging signal 30 such that it converges toward a focal point as it propagates toward the appropriate output waveguide. The position of the focal point to which signal 30 focuses is based upon the radius of curvature of convex reflective surface 38 and/or the thickness of switchplate 22. A particular advantage provided by this aspect of the present invention is that convex reflective surface 38 reflects a diverging signal 30 such that it converges toward the appropriate output waveguide, thereby achieving maximum optical coupling, throughput, and/or transmission among input and output waveguides.

Figure 5B:
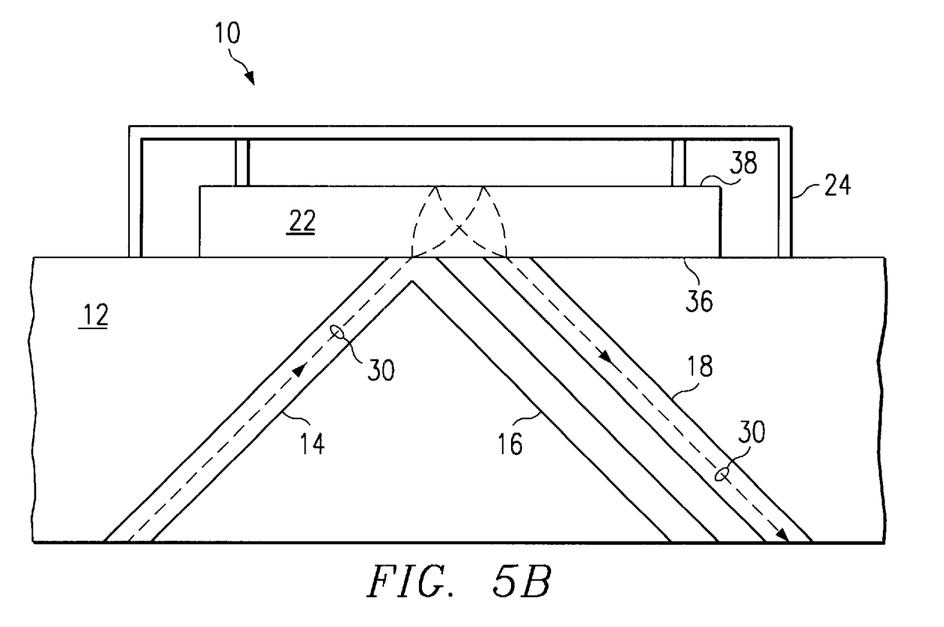

FIG. 5B illustrates yet another embodiment of switch 10 that includes a switchplate 22 comprising a gradient index (GRIN) lens having a planar contact surface 36 and a planar reflective surface 38. In operation of switch 10 with switchplate 22 spaced apart from input waveguide 14, total internal reflection at the interface between material 20 and input waveguide 14 directs optical signal 30 to output waveguide 16. When switchplate 22 is placed in proximal contact with input and/or output waveguides of switch 10, switchplate 22 frustrates the total internal reflection of signal 30. In this embodiment, switchplate 22 collimates signal 30 as it propagates from surface 36 to surface 38. Switchplate 22 then decollimates and focuses signal 30 as it propagates from surface 38 toward the appropriate output waveguide of switch 10. A particular advantage provided by this aspect of the present invention is that the gradient index characteristics of switchplate 22 cause signal 30 to focus at the appropriate output waveguide upon reflection by surface 38, thereby achieving maximum optical coupling, throughput, and/or transmission among input and output waveguides.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. An optical switch for processing an optical signal, comprising:
   a refractive material, the input waveguide having a second index of refraction;
   an input waveguide formed in the refractive material and operable to receive an optical signal;
   a first output waveguide formed in the refractive material;
   a second output waveguide formed in the refractive material;
   a switchplate coupled to the refractive material, the switchplate having a first position spaced apart from the input waveguide such that the input waveguide totally internally reflects the optical signal to the first output waveguide, and the switchplate having a second position in proximal contact with the input waveguide to frustrate the total internal reflection of the optical signal such that the second output waveguide receives the optical signal.

2. The optical switch of claim 1, further comprising:
   an input fiber coupled to the input waveguide and operable to communicate the optical signal to the input waveguide;
   a first output fiber coupled to the first output waveguide and operable to receive the optical signal when the switchplate is placed in the first position; and
   a second output fiber coupled to the second output waveguide and operable to receive the optical signal when the switchplate is placed in the second position.

3. The optical switch of claim 1, wherein:
   the input waveguide comprises an input fiber;
   the first output waveguide comprises a first output fiber; and
   the second output waveguide comprises a second output fiber.

4. The optical switch of claim 1, wherein the switchplate further comprises a reflective surface and a contact surface.

5. The optical switch of claim 4, wherein the reflective surface of the switchplate is a convex surface.

6. The optical switch of claim 1, further comprising an actuator coupled to the switchplate and operable to position the switchplate in a selected one of the first position and the second position in response to a control signal.

7. The optical switch of claim 1, wherein:
   the switchplate has a third index of refraction substantially similar to the second index of refraction.

8. The optical switch of claim 7, wherein the second index of refraction is higher than the first index of refraction.

9. The optical switch of claim 1, wherein the switchplate comprises a GRIN lens.

10. The optical switch of claim 1, wherein the switchplate comprises a first switchplate and further comprising:

a third output waveguide formed in the refractive material;

a fourth output waveguide formed in the refractive material;

a fifth output waveguide formed in the refractive material;

a sixth output waveguide formed in the refractive material; and a second switchplate coupled to the refractive material.

11. The optical switch of claim 10, wherein:

the first switchplate is placed in the first position; and the second switchplate has a first position spaced apart from the first output waveguide such that the first output waveguide totally internally reflects the optical signal to the third output waveguide, and the second switchplate has a second position in proximal contact with the first output waveguide to frustrate the total internal reflection of the optical signal such that the fourth output waveguide receives the optical signal.

12. The optical switch of claim 10, wherein:

the first switchplate is placed in the second position; and the second switchplate has a first position spaced apart from the second output waveguide such that the second output waveguide totally internally reflects the optical signal to the fifth output waveguide, and the second switchplate has a second position in proximal contact with the second output waveguide to frustrate the total internal reflection of the optical signal such that the sixth output waveguide receives the optical signal.

13. The optical switch of claim 10, further comprising:

a first actuator coupled to the first switchplate and operable to position the first switchplate in a selected one of the first position and the second position in response to a first control signal; and a second actuator coupled to the second switchplate and operable to position the second switchplate in a selected one of a first position and a second position in response to a second control signal.

14. The optical switch of claim 1, wherein:

the input waveguide comprises an input planar waveguide;

the first output waveguide comprises a first output planar waveguide; and the second output waveguide comprises a second output planar waveguide.

15. A method for processing an optical signal, comprising:

receiving an optical signal at an input waveguide formed in a first refractive material, the refractive material having a first index of refraction and the input waveguide having a second index of refraction;

placing a switchplate in a first position spaced apart from the input waveguide such that the input waveguide totally internally reflects the optical signal to a first output waveguide formed in the first refractive material;

placing the switchplate in a second position in proximal contact with the input waveguide to frustrate the total internal reflection of the optical signal; and totally internally reflecting the optical signal at a reflective surface of the switchplate to a second output waveguide formed in the first refractive material.

16. The method of claim 15, wherein:

the input waveguide comprises an input fiber;

the first output waveguide comprises a first output fiber; and the second output waveguide comprises a second output fiber.

17. The method of claim 15, further comprising positioning the switchplate in a selected one of the first position or the second position in response to a control signal.

18. The optical switch of claim 15, wherein the switchplate further comprises a reflective surface and a contact surface.

19. The optical switch of claim 18, wherein the reflective surface of the switchplate is a convex surface.

20. The method of claim 15, wherein:

the switchplate has a third index of refraction substantially similar to the second index of refraction.

21. The method of claim 20, wherein the second index of refraction is higher than the first index of refraction.

22. The method of claim 15, wherein the switchplate comprises a GRIN lens.

23. The method of claim 15, wherein:

the input waveguide comprises an input planar waveguide;

the first output waveguide comprises a first output planar waveguide; and the second output waveguide comprises a second output planar waveguide.

24. The method of claim 15, wherein the switchplate comprises a first switchplate, and further comprising:

placing a second switchplate in a first position spaced apart from the second output waveguide such that the second output waveguide totally internally reflects the optical signal to a third output waveguide formed in the refractive material;

placing the second switchplate in a second position in proximal contact with the second output waveguide to frustrate the total internal reflection of the optical signal; and totally internally reflecting the optical signal at a reflective surface of the second switchplate to a fourth output waveguide formed in the refractive material.

25. The method of claim 24, further comprising:

positioning the first switchplate in a selected one of the first position and the second position in response to a first control signal; and positioning the second switchplate in a selected one of the first position and the second position in response to a second control signal.

* * * * *